(No Model.)  3 Sheets—Sheet 3.

C. H. ROBERTS.
BAND SAW MILL.

No. 509,557.  Patented Nov. 28, 1893.

Witnesses
John C. Shaw
N. P. Riley

Inventor
Charles H. Roberts.
by C. A. Snow & Co.
Attorneys.

UNITED STATES PATENT OFFICE.

CHARLES H. ROBERTS, OF EAU CLAIRE, WISCONSIN.

BAND-SAW MILL.

SPECIFICATION forming part of Letters Patent No. 509,557, dated November 28, 1893.

Application filed April 26, 1893. Serial No. 471,944. (No model.)

*To all whom it may concern:*

Be it known that I, CHARLES H. ROBERTS, a citizen of the United States, residing at Eau Claire, in the county of Eau Claire and State of Wisconsin, have invented a new and useful Band-Saw Mill, of which the following is a specification.

The invention relates to improvements in band saw mills.

The object of the present invention is to improve the construction of band saw mills, to enable the band saw to be maintained taut or suitably strained, and to adjust the saw supporting frame horizontally to maintain the parts in plumb.

A further object of the invention is to simplify the construction of the saw supporting frame, and to enable the latter to be readily assembled and handled.

The invention consists in the construction and novel combination and arrangement of parts hereinafter fully described, illustrated in the accompanying drawings and pointed out in the claims hereto appended.

Figure 1:
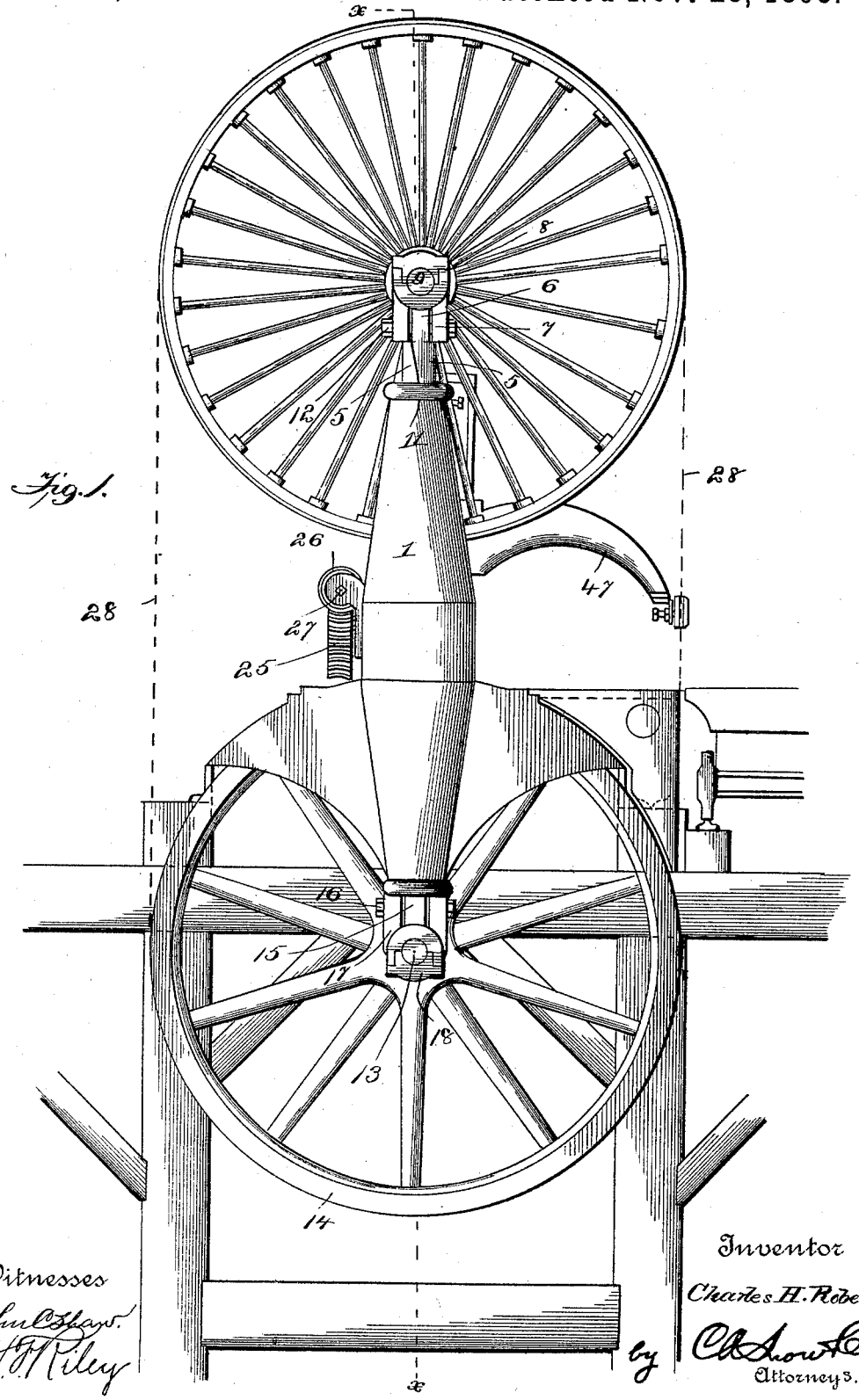
Figure 2:
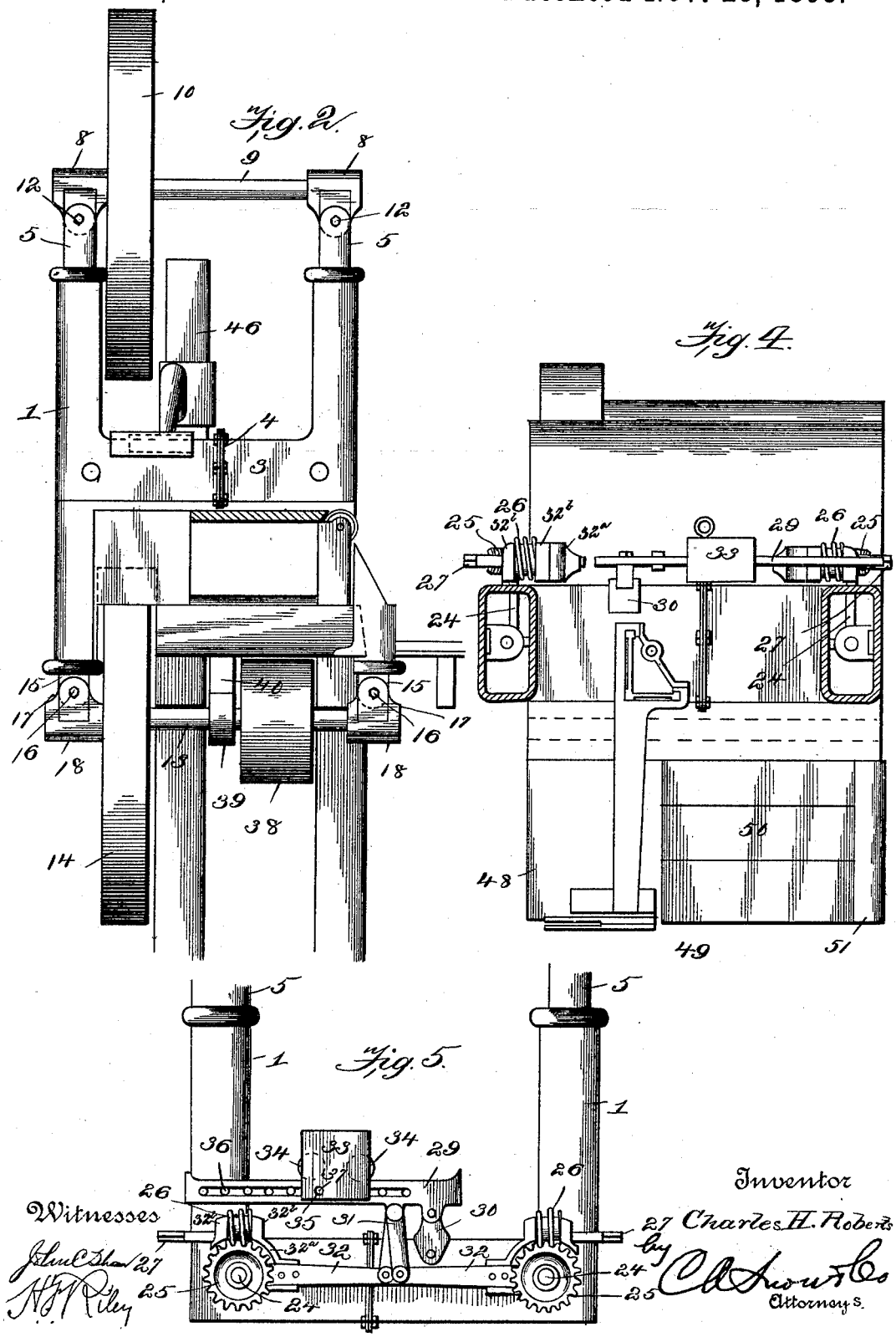
Figure 3:
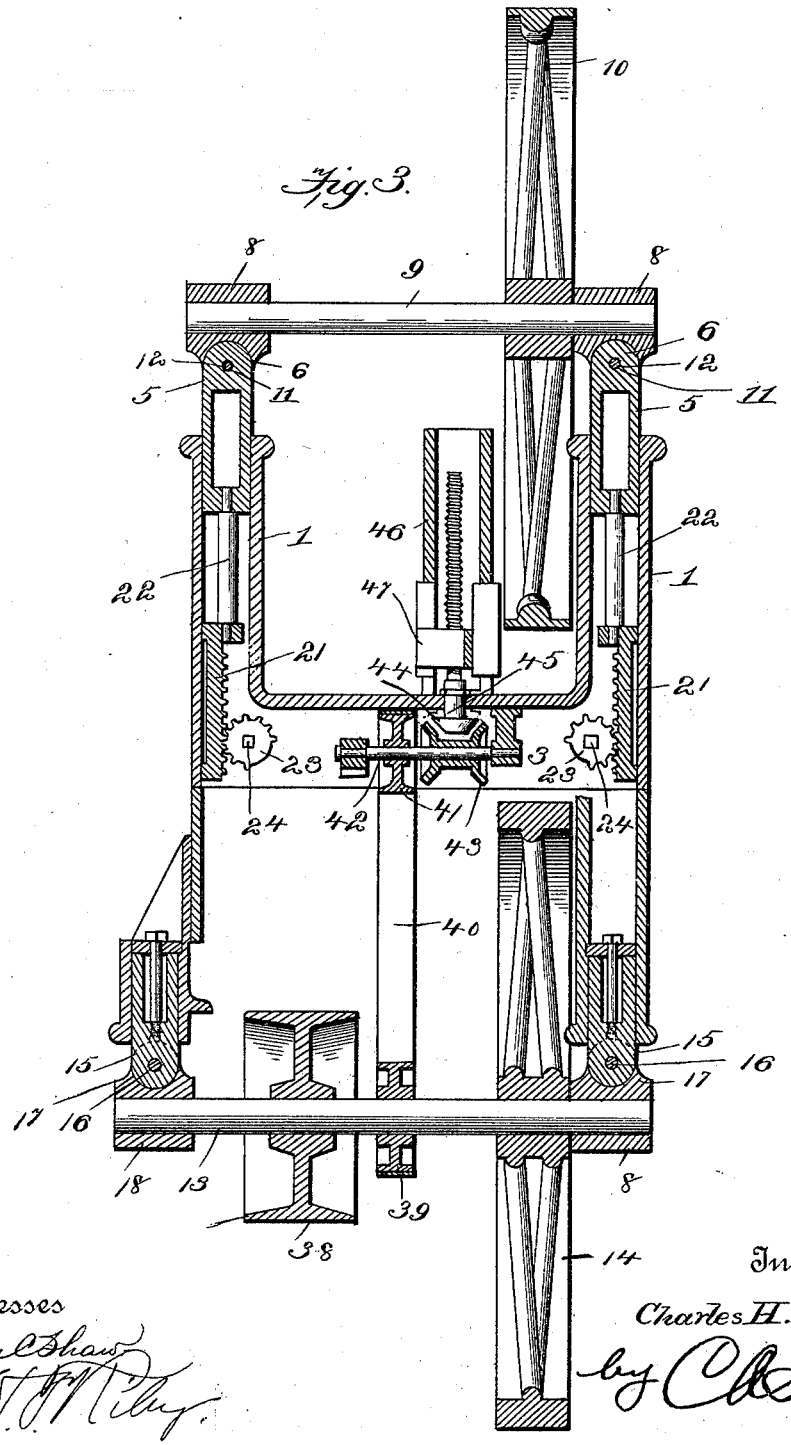

In the drawings—Figure 1 is a front elevation of a band saw mill constructed in accordance with this invention. Fig. 2 is a side elevation of the same. Fig. 3 is a central vertical sectional view on line $x$—$x$ of Fig. 1. Fig. 4 is a horizontal sectional view. Fig. 5 is a rear elevation of a portion of the band saw mill, illustrating the adjusting and straining mechanism.

Like numerals of reference indicate corresponding parts in all the figures of the drawings.

1—1 designate vertical hollow uprights of a saw supporting frame, which consists of two sides, and which has a horizontal casing 3 centrally divided vertically and bolted together at 4, whereby the saw supporting frame may be conveniently handled, shipped, and assembled with more ease were its sides not separate, and were the portions of the horizontal casing integral. This construction makes that portion of each side of the saw supporting frame comprising the upper portion of the hollow upright, and the horizontal casing substantially L-shaped. The hollow supports or uprights 1 have vertically adjustably mounted in them posts 5, having reduced upper ends 6 arranged between depending flanges 7 of journal boxes 8 of the shaft 9 of the upper band saw pulley 10. The reduced ends of the posts 5 are provided with horizontal threaded openings 11 receiving adjusting screws 12, passing through the flanges 7 of the journal boxes and adapted to shift the journal boxes to adjust the shaft 9 and the upper band wheel 10, to make those parts perfectly plumb. The lower ends of the uprights 1—1 are similarly connected with a shaft 13 carrying a lower band saw pulley 14, and have secured in their lower ends stems 15, which are secured adjustably by screws 16 to flanges 17 of journal boxes 18 receiving and supporting the lower shaft 13. The posts 5 are connected with and supported upon vertically movable rack bars 21, by posts or bars 22 of less diameter than the posts 5, and having their ends reduced and arranged in sockets of the lower ends of the said posts 5 and the upper ends of the rack bars. The rack bars which are arranged in the hollow uprights, each mesh with, and is actuated by a mutilated pinion 23, mounted on a horizontal shaft 24, journaled in the horizontal casing 3, and disposed transversely of the same near one end thereof. The shaft 24 extends through the horizontal casing at the rear side of the saw supporting frame, and has mounted on it a worm gear 25, which meshes with a worm 26 of the crank shaft 27. The crank shaft 27 is adapted to be turned by a suitable detachable crank handle (not shown) to lower the post 5 when it is desired to remove or adjust the band saw 28, and to adjust the band saw pulleys to receive different sizes of band saws, and for analogous purposes. The saw is maintained at the proper tension by a weighted lever 29 fulcrumed near one end on a bracket or support 30, and connected by link bars 31 with the adjacent ends of arms or bars 32. Each bearing $32^a$ is journaled on one of the shafts 24, and has journaled on it the adjacent crank shaft 27, the worm being arranged between lugs $32^b$ of the bearing $32^a$. The lever 29 has adjustably mounted on it a sliding weight 33 provided with rollers 34, and having a perforation 35 adapted to register with any of a series of perforations 36 of the lever 29, and to receive a pin 37 to secure the weight at any desired adjustment. By sliding the weight along the lever 29, the desired tension may be maintained on the band saw, as the weight will operate the arms or bars 32, which will be locked rigid with the shafts 24 by the worms locking with the worm wheels. The bearing 32ª, the worm and its shaft 27 are adapted to oscillate on the shaft 24 to preserve the proper tension on the saw. The lower shaft 13 has mounted on it a drive pulley 38 and a small pulley 39, which communicate motion by a belt 40 with a similar pulley 41 of a shaft 42. The shaft 42 is journaled in suitable bearings in the horizontal casing 3, and carries a double friction pulley 43 adapted to be shifted along a key or feather of the shaft by a suitable shifter (not shown) to bring either of its sides in contact with a cone pulley 44 of a vertical adjusting screw 45. The vertical adjusting screw is arranged in the standard 26 and engages a saw guide-arm 47, which is adjustably or slidingly mounted on the standard 46. By rotating the adjusting screw in one direction, the saw guide-arm is raised. By turning the screw in the opposite direction the said guide-arm is lowered, and this may be readily accomplished by bringing the cone pulley 44 in frictional contact with either side of the double cone pulley 43.

The lumber deck 48 in the saw mill consists of a metal section 49 and a wooden portion 50, which is provided at its outer end with a roll 51.

From the foregoing description taken in connection with the accompanying drawings, the construction, operation and advantages of the invention will be readily understood and appreciated by those skilled in the art.

Changes in the form, proportion and the minor details of construction may be resorted to without departing from the principle or sacrificing any of the advantages of this invention.

What I claim is—

1. In a band saw mill, the combination of a saw supporting frame having hollow uprights, vertically movable posts arranged in the uprights, journal boxes mounted on the posts, a shaft arranged in the journal boxes, a band saw pulley mounted on the shaft, rack-bars mounted in the uprights and supporting the posts, shafts 24 journaled in the frame, pinions mounted on the shafts 24 and meshing with the rack-bars, arms extending from the shafts, and connected therewith and a weighted lever connected with the arms, substantially as described.

2. In a band saw mill, the combination of a saw supporting frame having hollow uprights, posts mounted in the uprights, rack-bars arranged in the uprights and supporting the posts, shafts journaled in the frame, pinions mounted on the shafts and meshing with the rack-bars, worm gear mounted on the shafts, crank shafts, and worms mounted on the crank shafts and meshing with the worm gears, substantially as described.

3. In a band saw mill, the combination of a saw supporting frame having hollow uprights, posts mounted in the uprights, rack-bars arranged within the hollow uprights and supporting the posts, shafts journaled in the frame arms, connected with the shafts pinions mounted on the shafts and meshing with the rack bars, a lever fulcrumed on the frame and provided with an adjustable weight, and link-bars connecting the lever with said arms, substantially as described.

4. In a band saw machine, the combination of a saw supporting frame having hollow uprights, posts mounted in the uprights and provided with rack bars, shafts journaled on the frame, pinions carried by the shafts and meshing with the rack bars, bearings journaled on the shafts, arms secured to the bearings, worm wheels secured to said shafts, crank shafts journaled in said bearings, worms carried by the crank shafts and meshing with the worm wheels, and a weighted lever connected with said arms, substantially as described.

In testimony that I claim the foregoing as my own I have hereto affixed my signature in the presence of two witnesses.

CHARLES H. ROBERTS.

Witnesses:
ROBERT SATHER,
OLE BJERKLI.